May 2, 1950 G. HERZOG 2,506,149
WELL LOGGING
Filed Oct. 19, 1946 2 Sheets-Sheet 1
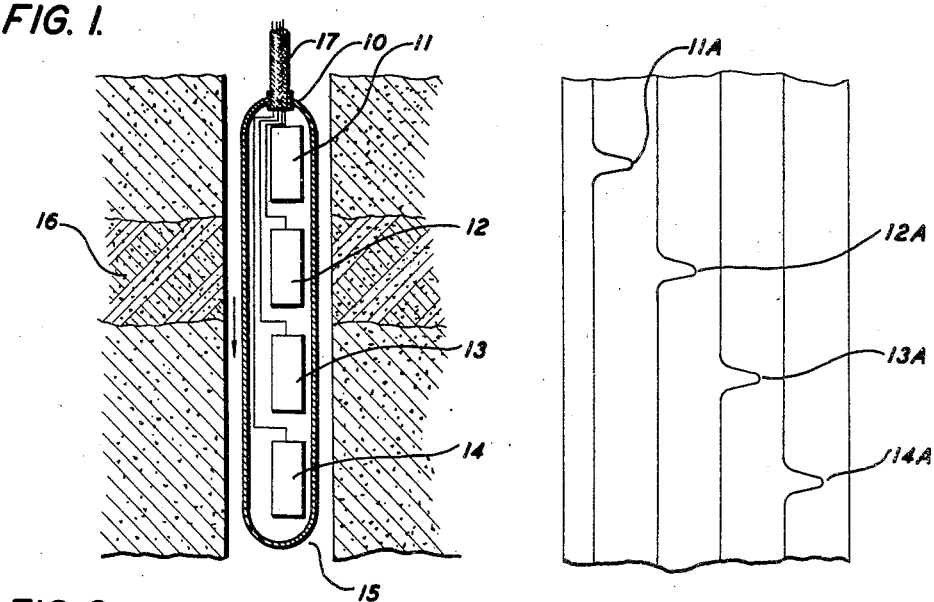
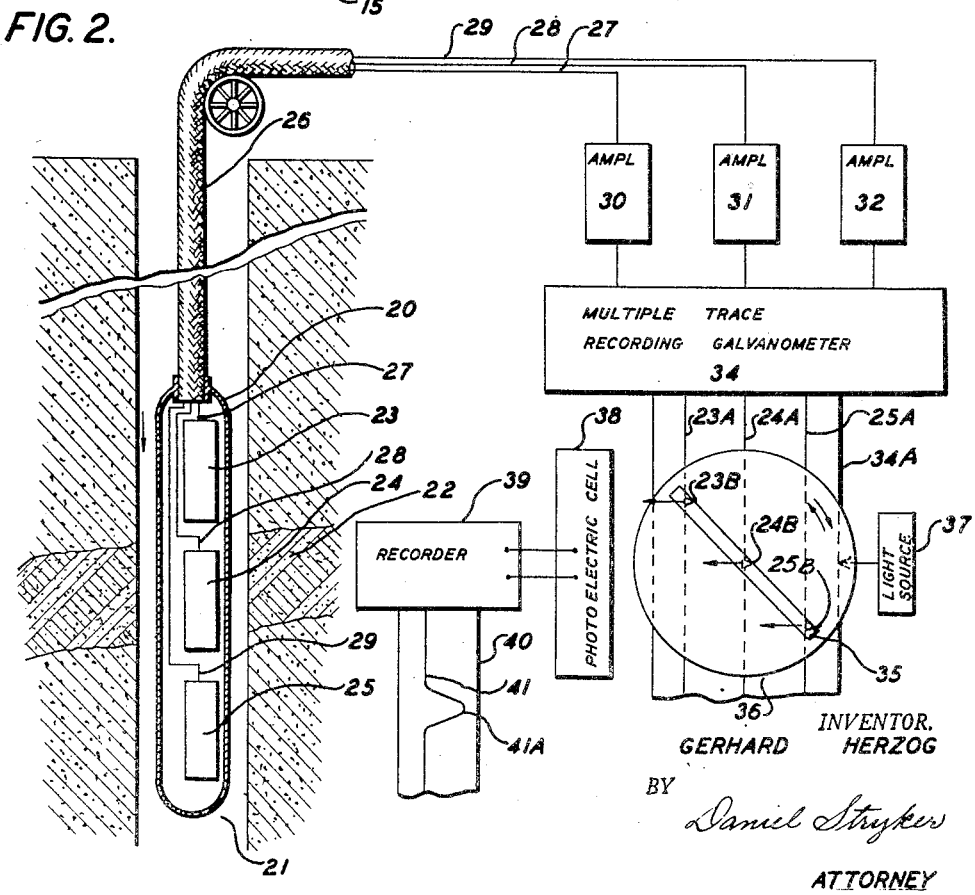
INVENTOR.
GERHARD HERZOG
BY Daniel Stryker
ATTORNEY May 2, 1950 — G. HERZOG — 2,506,149
WELL LOGGING
Filed Oct. 19, 1946 — 2 Sheets-Sheet 2

INVENTOR.
GERHARD HERZOG
BY Daniel Stryker
ATTORNEY

Patented May 2, 1950

2,506,149

UNITED STATES PATENT OFFICE 2,506,149

WELL LOGGING

Gerhard Herzog, Houston, Tex., assignor to Texaco Development Corporation, New York, N. Y., a corporation of Delaware Application October 19, 1946, Serial No. 704,463

16 Claims. (Cl. 250—83.6)

This invention is concerned with detection of radiation, particularly in well logging and the like wherein natural or artificially induced radiations from geological strata are detected and serve to identify the strata.

A well may be logged by passing along its bore a radiation detector, for example a counter of the Geiger-Müller type, to detect variations in the emanations (usually gamma rays) from different strata penetrated by the well. Wells may also be logged through the detection of neutrons or other radiations reflected from the walls of the wells and originating in a neutron source passed down the well along with the logging equipment.

In gamma ray or neutron logging of a well, it is important that the resolving power of the instrument be such as to detect thin strata, since major interest may be concentrated on a thin geological horizon only a matter of inches thick. Since resolving power, i. e. the ability to detect thin strata, requires that the radiation detector be no longer than the strata is thick, the length of the equipment is limited. Its width or diameter is also limited by the cross section of the hole. Consequently, radiation detectors of adequate resolving power for the detection of a thin stratum must be small. Once the size (i. e. the length and cross section of the detector) is established, the sensitivity of the instrument is determined, and the smaller the instrument, for a given intensity of gamma rays or neutrons, the less its sensitivity.

Instruments employed in the detection of gamma ray and neutron intensities fall into two general classes. The first includes counters of the Geiger-Müller variety, in which a wire anode and a cathode separated therefrom are disposed inside an insulating envelope, say a glass tube, the interior of which is filled with a gas, for example, hydrogen, at low pressure. A potential is impressed between the two electrodes and kept at the level such that the counter will "fire" or "trigger" if the gas within the envelope is ionized. Thus a conventional Geiger-Müller counter consists of a thin walled metal cathode of tubular form with a thin wire comprising the anode passing axially through the cathode. These two electrodes are enclosed in a glass envelope containing a suitable gas, say hydrogen, at a relatively low pressure, say 5 to 10 centimeters of mercury. The anode is maintained at a positive potential with respect to the cathode, and a fairly high resistance is placed in the circuit between them. Normally the potential difference between the anode and cathode is nearly but not quite high enough to cause a discharge to take place. If a particle, say an electron is liberated in the detector due to the impingement of primary radiation, the gas will be ionized and a discharge will take place with a current flow of the order of a few micro amperes. This causes a large voltage drop across the resistance, and the discharge will cease after a very short period of time. By suitably amplifying the sudden voltage drop across the resistance, the discharge of the counter may be measured. After the discharge has ceased, the counter is again in condition to register the passage of an ionizing particle.

The other type of counter mechanism available for oil well logging and the like comprises a high pressure ionization gauge. In such an apparatus a pair of electrodes is disposed in an envelope which is filled with a gas such as argon or nitrogen under super atmospheric pressure. The electrode potential is adjusted to a value which will permit a continuous current flow, varying in magnitude proportionally to the intensity of radiation entering the envelope.

In the foregoing instruments, as well as in all other instruments which measure gamma rays or neutron intensity, the instrument output fluctuates according to the natural statistical fluctuations in the radiation being detected. The fluctuation in the output of the instrument becomes smaller as the time for the measurement is increased. In other words, applied to the well logging field, the readings become more accurate if the instrument is moved slowly along the well. This is objectionable, however, from a practical standpoint, since it is costly to tie up a well for long periods in logging or other purely investigative activities.

From the foregoing, it will be apparent that high resolving power and high logging speeds are desirable. Heretofore they have only been attained through sacrifice of sensitivity in the radiation detector, with consequent decrease in the reliability of logging results.

As a result of my investigations, I have developed an instrument in which high sensitivity is obtainable even at high speeds and with no sacrifice in resolving power.

The improved detector of my invention employs a string or chain of detector elements spaced from each other in the direction of the well axis, each detector element being short enough to have the resolving power necessary to detect a stratum of predetermined thickness. Means are provided for sending the responses of the separate detector elements separately to the indicating or recording equipment at the surface, for example through individual cables, or the responses of the several elements can be sent through a single conductor and separated on the surface by electrical filters, etc. The responses of the several detector elements are amplified (preferably separately) and the responses are then combined automatically. The result of this operation is sensitivity together with high resolving power, for sensitivity becomes a function of the size of the detector units considered as a whole, i. e. as a single detector corresponding in size to the sum of the individual detectors, while resolving power continues to be a function of the length of the individual detectors.

The automatic combination of the responses into a single response may be accomplished in several ways, for example by photoelectric means, by electromagnetic means or by condenser effect.

These and other aspects of my invention will be understood more thoroughly in the light of the following detailed description taken in conjunction with the accompanying drawings in which Fig. 1 is a diagram illustrating the individual responses obtained from a series of spaced detectors being passed as a group down a bore hole;

Fig. 2 illustrates one form of the mechanism of my invention adapted to combine responses photoelectrically;

Figure 3:
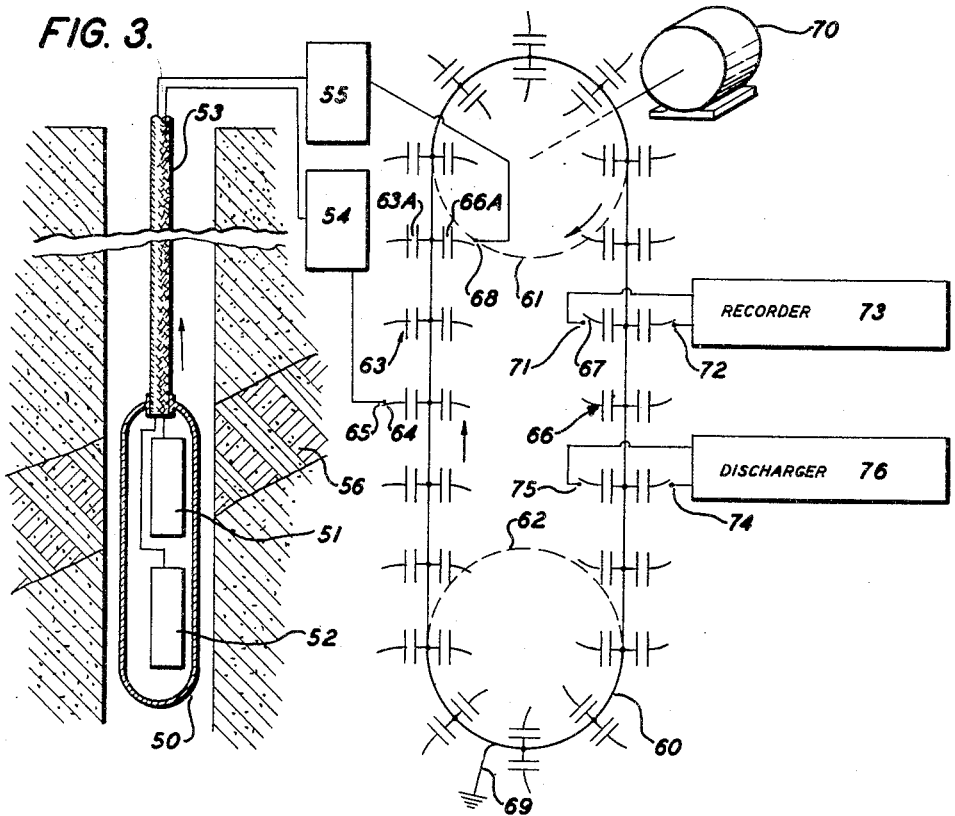
Fig. 3 is a diagram illustrating a modified form of the apparatus in which responses are combined by a condenser combination.

Referring to Fig. 1, a detector head 10 with spaced individual detectors 11, 12, 13, 14 is lowered down a bore hole 15 in which the wall material is homogeneous, save for a single thin stratum 16 to be detected. In order to have adequate resolving power, the individual detectors, which may be conventional Geiger-Müller counters, are somewhat shorter than the stratum is thick.

The detector head with its four spaced individual detectors is connected through amplification means (not shown) to the surface by a cable 17 containing conductors running respectively from the four detectors to individual amplifying and recording elements (not shown). When the detector head is lowered down the well past the stratum 16, a photographic record such as that shown on the right of Fig. 1 is obtained. Element 12 is opposite the stratum to be detected, and it produces a peaked trace 12A on the record. Element 13 has already passed the stratum resulting in a peak 13A on the record, and likewise the earlier passage of element 14 has produced a peak 14A on still another trace. When element 11 arrives opposite the strata the result will be a further trace 11A. Thus the peak produced by each element is shifted on the record by distances proportional to the vertical distances between the elements in the head.

The record obtained in Fig. 1 is useful, but a combined record of the several peaks is more useful, as well as more reliable, since in combining the records natural statistical fluctuations in the radiation are compensated for, to the end that the combined record is a more accurate indication of the stratum to be detected than any of the four individual peaks.

Fig. 2 shows one form of apparatus in which the individual records of a series of spaced radiation detectors may be combined despite the displacement of the several peaks. In Fig. 2, a detector head 20 is being lowered in a bore hole 21, the wall of which is homogeneous except for a thin stratum 22 to be detected. The detector head contains a series of vertically spaced radiation detectors 23, 24, 25 (each provided with a suitable preamplifier) and connected through a cable 26 and individual leads 27, 28, 29 (disposed in the cable) respectively to a series of amplifiers 30, 31, 32 which may be located at the surface as shown or, if preferred, in the head of the instrument itself. Or sets of pre-amplifiers can be placed in the head, with an additional amplifier for each detector at the surface.

The output of each of the amplifiers is sent to a multiple trace recording galvanometer 34, which makes a continuous photographic record 34A of the responses of the individual detectors similar to that shown in Fig. 1, the record being made on a travelling film. Thus the photographic record has on it three traces 23A, 24A, 25A respectively corresponding to the responses of the three individual detectors 23, 24, 25. Each trace has a peak corresponding to the response of its detector when the latter passes the thin stratum in the well. Thus trace 23A has a peak 23B; trace 24A has a peak 24B; and trace 25A has a peak 25B, the three peaks being displaced from each other by distances proportional to the distances between the detector elements. If the detector elements are equally spaced and likewise the three traces are equally spaced from each other, the individual peaks will lie along an oblique straight line, such for example as the axis of a slot 35 disposed on the diameter of a rotatable shield 36.

The individual traces are recorded after the fashion of sound film, i. e. the sound track on a moving picture film, so that the individual peaks are solid, either opaque or transparent, in contrast to the balance of the film.

The shield 36 is placed on the face (say the front) of the film, and a light source 37 is placed adjacent the other face (say the back) of the film. A photoelectric cell 38 lies in the path of the light beam through the slot. The photoelectric cell is connected to suitable amplifying and recording means 39. This recording means, say a single trace recording galvanometer, continuously produces a photographic record 40 which has a trace 41 with a peak 41A. This peak, for reasons to be explained hereinafter, represents the combination of the three individual peaks on the film produced by the multiple trace recording galvanometer 34.

The apparatus just described is an electrical-optical means for adding the individual responses of the three detectors. The slot in the scanning shield is set so that the three peaks 23B, 24B, 25B appear in the slot at the same instant. The response of the three peaks is thus combined photoelectrically, since the response of the photoelectric cell will vary directly as the amount of light passing from the light source 37, this amount being controlled by the size of the peaks on the film.

The apparatus of Fig. 2 thus automatically produces a combined record characterized by the same resolving powers that would be obtained through the use of a single detector element, but in accuracy it corresponds to the average value of three individual runs with the single detector element. To express the matter in another way, the apparatus of Fig. 2 allows a logging speed which is N times faster (N being the number of individual detector elements) than the speed with which a single detector element has to be used. So, for the same resolving power and the same accuracy, an instrument constructed in accordance with the invention with N detector elements allows a logging speed which is N times faster than the speed with which a single detector has to be used.

As noted above, the shield of the apparatus is rotatable on its center so that the angle which the scanning slot makes with the individual traces can be adjusted. This permits a variety of results to be obtained. For example, if one places the slot perpendicular to the axes of the traces, a record is obtained similar to that which would be obtained with a single detector, corresponding in length to the total of the individual detectors involved. For example, if three traces are used as in the instant case, the apparent length of the detector corresponds to three times the length of one detector element. By varying the number of traces which are added up without phase shift, records may be obtained which correspond to logging with detectors of different lengths.

It is not necessary to employ individual conductors for each element in the apparatus of Fig. 1. As already pointed out, the responses of the different detector elements can be sent through a single conductor and separated at the surface of the ground by an electrical filter network.

Fig. 3 illustrates schematically another apparatus for combining the responses from two spaced radiation detectors being drawn up a well. (Logging usually is carried on up the well rather than down to make sure that the head moves properly and does not "hang up" in the hole.) The head 50 contains two vertically spaced detectors, say Geiger-Müller counters, 51, 52 connected respectively by individual leads through a cable 53 to amplifiers 54, 55.

As in the previous cases, the detector head moves along the well bore through homogeneous formations past a thin stratum 56 to be detected through a variation in radiation response, the individual detectors being short enough to have the necessary resolving power to detect this stratum.

The staggered responses of the two detectors are combined by means of a multiple condenser combination. An endless conductive belt 60 runs clockwise on a pair of supporting pulleys, 61, 62 of insulating material. The outside of the belt carries a group 63 of identical condensers spaced along its periphery. Each condenser carries a contact 64 on the outside which makes momentary contact with a point 65 connected to the output of the amplifier 54.

The inside of the moving belt similarly carries another group or bank 66 of condensers disposed respectively opposite condensers of the outer bank. Each of these condensers has a brush 67 which makes contact with a contact point 68 from the amplifier 55.

In both instances the circuit from amplifier through condenser is completed by a ground connection 69 to the belt.

The drums or pulleys which move the belt carrying the condensers is driven by a motor 70, or by gearing or other mechanical linkage connected to the means, say a sheave wheel (not shown) by which the head is lowered in the well.

The individual condensers of the outer bank pick up charges from the amplifier 54 which in turn varies in accordance with the variations of the detector 51. Likewise the condensers of the inner bank pick up charges corresponding to the output of the amplifier 55, which in turn varies in accordance with the response of the detector 52. The charges on each pair of condensers, one in the inner bank and one in the outer bank, are measured simultaneously and combined by coming in contact with brushes 71, 72 connected to a recording or indicating device 73. Immediately afterward, the condensers are completely discharged by passing through a set of brushes 74, 75 connected to a condenser discharger 76.

In the operation of the device of Fig. 3, the spacing of the brushes which charge the condenser groups and the motion of the condensers with respect to the brushes are correlated to the detector spacing and to the logging speed so that condenser charges corresponding to responses from the same stratum are superimposed or combined. Thus, the endless belt is moved at a rate such that the condenser 63A of the outer bank (having first picked up a charge corresponding to the response of the detector 51 when it is opposite the stratum 56) is opposite the brush 68 at the time that a charge corresponding to the response of the detector 52 to the same stratum is impressed upon the condenser 66A. The condensers 63A, 66A thus constitute a pair which come simultaneously into contact with the recorder 73 to the end that the time difference between the two responses from the same stratum is compensated for or "corrected."

The necessary correlation of belt movement with logging speed is assured if the belt and the cable reel are driven by the same means at proper relative rates, so that individual condensers carrying charges corresponding to the response of different detectors to the same stratum arrive at the recording means at the same time.

A wheel can be substituted for the moving belt of the apparatus of Fig. 3, and the means employed for moving the belt or the wheel preferably is such that the condensers move past the brushes in steps, pausing for an instant opposite the brushes to assure complete charging. A cam or ratchet device (not shown) can be employed as a mechanical linkage to secure such movement.

If desired, the difference between the responses of the two detectors may be obtained. Thus by reversing the input of one bank of condensers with respect to the input of the other bank of condensers to the recorder, the difference is picked up by the recorder.

It will be apparent that, if desired, additional sets of condensers may be placed on the belt to combine the responses from additional detector heads.

Figure 4:
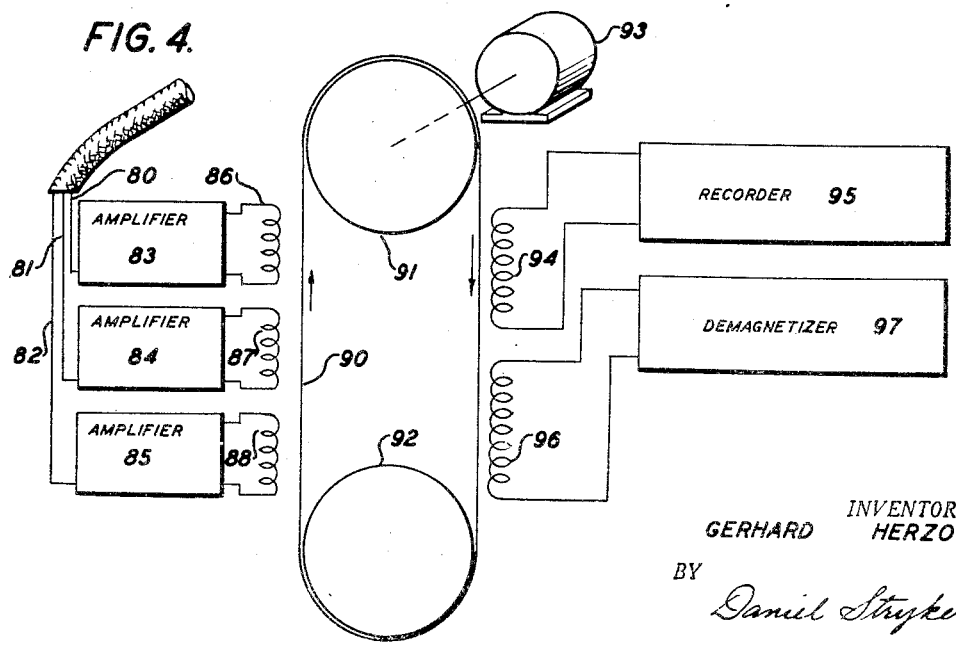
Fig. 4 is a diagram illustrating still another means for combining the responses of the several detectors by electro magnetic means.

Fig. 4 illustrates apparatus wherein the individual responses of a series of vertically spaced radiation detectors is combined by magnetic means. As in the previous cases, the several spaced detectors (not shown) are connected by individual leads 80, 81, 82 respectively to amplifying devices 83, 84, 85. The outputs of the amplifiers are sent respectively to coils 86, 87, 88. A magnetizable tape 90 passes clockwise around a pair of drums 91, 92. One of the drums is driven by a motor 93 or by mechanical linkage to the means employed to move the detectors in the well.

The three coils serve to magnetize the tape cumulatively with the result that the individual responses of the three detectors exert a combined magnetic effect on the tape. The combined effect is registered by means of a pickup coil 94 connected to a suitable amplifier and recording element 95. Next the tape passes by a demagnetizer coil 96 energized by suitable demagnetizing means 97 and is then ready to pick up additional responses.

In short, each of the energizing coils is connected to an individual radiation detector, say a Geiger-Müller counter and is so arranged along the tape that the coils add to the magnetization of the tape in proportion to the output of the counter which they represent. The spacing of the coils along the tape is proportional to the spacing of the individual detectors in the head, and the speed of the tape is so correlated to the logging speed that a given tape section picks up the respective responses of the three detectors from the same stratum. The total magnetism introduced into the tape is then measured by the pickup coil and after this magnetism is recorded and the tape is demagnetized, the procedure is repeated.

In short, the apparatus of Fig. 4 is adapted to do magnetically what the apparatus of Fig. 3 does with condenser charges and is operated in a similar fashion. The magnetic tape of Fig. 4 can be mounted on the periphery of a single wheel rather than on a pair of drums, and if the demagnetizing means is eliminated, the tape can be discarded after it passes the recorder.

I claim:

1. In logging involving the detection of variations in radiation along a bore hole, the improvement which comprises passing a chain of spaced radiation detectors along the bore hole so that the responses of the individual detectors to radiation from the same level in the bore hole are displaced in time and automatically combining the individual responses from that level by automatically accumulating in the neighborhood of the surface of the ground the responses as a series of condenser charges.

2. In logging involving the detection of variations in radiation along a bore hole, the improvement which comprises passing a chain of spaced radiation detectors along the bore hole so that the responses of the individual detectors to radiation at a given level in the bore hole are displaced in time and automatically combining the individual responses from a given level by automatically accumulating in the neighborhood of the surface of the ground the responses photoelectrically.

3. In logging involving the detection of variations in radiation along a bore hole, the improvement which comprises passing a chain of spaced radiation detectors along the bore hole so that the responses of the individual detectors to radiation at a given level in the bore hole are displaced in time and automatically combining the individual responses from a given level by automatically accumulating the responses in a magnetizable body located adjacent the surface of the ground as a series of magnetic forces.

4. In apparatus for bore hole logging, the combination which comprises a plurality of radiation detectors mechanically connected to each other at fixed distances along the bore and adapted to be passed along the bore in a group, whereby the responses of the individual detectors to radiation at a given level in the bore hole are displaced in time, and photoelectric means remote from the detectors for automatically combining the individual responses corresponding to such given level.

5. In apparatus for bore hole logging, the combination which comprises a plurality of radiation detectors mechanically connected to each other at fixed distances along the bore and adapted to be passed along the bore in a group, whereby the responses of the individual detectors to radiation at a given level in the bore hole are displaced in time, and means disposed in the neighborhood of the ground surface for automatically combining the individual responses corresponding to such given level, said means including a multi-trace galvanometer with which the responses from each detector is recorded as a trace, a film on which said traces are recorded, a screen provided with a slit so positioned with respect to the film that the portions of the several traces simultaneously appearing in the slit correspond to the same level in the bore hole, and photoelectric means for measuring the light intensity of the traces appearing in the slit at a given instant.

6. Apparatus according to claim 5 in which the screen is rotatable with respect to the film so that the angle the slit makes with the traces may be adjusted.

7. In apparatus for bore hole logging, the combination which comprises a plurality of radiation detectors mechanically connected to each other at fixed distances along the bore and adapted to be passed along the bore in a group, whereby the responses of the individual detectors to radiation at a given level in the bore hole are displaced in time, and means disposed in the neighborhood of the ground surface for automatically combining the individual responses corresponding to such given level, said means including an elongated magnetizable member, a plurality of coils disposed respectively in inductive relationship to the member and spaced from each other in proportion to the spacing of the radiation detectors and so arranged that their energization varies to correspond respectively with the responses of the individual detectors, a magnetic pickup inductively associated with the member, and means for moving the member successively past the coils to the pickup.

8. Apparatus according to claim 7 in which the magnetizable member is an endless belt, and demagnetizing means is disposed in inductive relationship therewith following the pickup.

9. In apparatus for bore hole logging, the combination which comprises a plurality of radiation detectors mechanically connected to each other at fixed distances along the bore and adapted to be passed along the bore in a group, whereby the responses of the individual detectors to radiation at a given level in the bore hole are displaced in time, and means disposed in the neighborhood of the ground surface for automatically compensating for the time-displacement of individual responses from a given level and combining said individual responses into a single response, the means including a plurality of condenser chains corresponding to the individual detectors and energized thereby, charge measuring means, and means for moving the individual condensers of each chain simultaneously and together into contact with the charge measuring means.

10. Apparatus according to claim 9 in which the condenser chains are so mounted that individual condensers move cyclically past the charge measuring means, the condenser discharge means being so mounted with respect to the charge measuring means that the condensers subsequently come in contact therewith and are discharged prior to return to energizable relationship with their respective detectors.

11. In bore hole logging, the improvement which comprises passing a plurality of radiation detectors spaced from each other by fixed distances along a bore hole, recording the separate response of each detector at the surface, and automatically combining the separate recorded responses into a single cumulative response record.

12. A method according to claim 11 wherein the separate records are combined so as to correct for the time displacement of the respective detectors so that the single record will comprise the combined responses of the plurality of detectors to a given stratum.

13. A method according to claim 11 wherein the separate records are combined in instantaneous sequence so that the single record will comprise a combined response of the plurality of detectors at a given time.

14. In a bore hole logging apparatus comprising a plurality of radiation detectors mechanically connected to each other at fixed distances along the bore and adapted to be passed along the bore in a group, amplification means connected to each of said plurality of radiation detectors, and a multi-trace galvanometer on which the amplified responses of each detector are recorded as a separate trace on a film, the improvement comprising an opaque screen superimposed over the film, an elongated slit in the screen through which a portion of each of the several traces is simultaneously visible, a light source disposed adjacent the film and on the opposite side thereof from said screen, and photo-electric means disposed adjacent said screen with the screen lying between the photo-electric means and the film, the photo-electric means acting to measure the intensity of the light passing through the portion of the traces appearing in the slit at a given instant.

15. Apparatus according to claim 14 in which the screen is rotatable with respect to the film on an axis perpendicular to the plane of the film so that the slit may be adjusted with respect to the trace on the film.

16. In apparatus for bore hole logging, the combination which comprises a plurality of radiation detectors mechanically connected to each other at fixed distances along the bore and adapted to be passed along the bore in a group whereby the responses of the individual detectors to radiation at a given level in the bore hole are displaced in time, means for transmitting the separate responses of the plurality of detectors to the surface and means for combining the separate transmitted responses into a single record, said means for combining the responses being alternatively adjustable to combine the responses corresponding to a given level and to combine the responses corresponding to a given time.

GERHARD HERZOG.

REFERENCES CITED

The following references are of record in the file of this patent:

UNITED STATES PATENTS

| Number | Name | Date |
| --- | --- | --- |
| 2,284,345 | Schlesman | May 26, 1942 |
| 2,288,278 | Howell | June 30, 1942 |
| 2,332,873 | Silverman | Oct. 26, 1943 |
| 2,370,162 | Hare | Feb. 27, 1945 |
| 2,391,093 | Howell | Dec. 18, 1945 |
| 2,469,461 | Russell | May 10, 1949 |